(12) United States Patent
Nakagata et al.

(10) Patent No.: US 8,339,677 B2
(45) Date of Patent: Dec. 25, 2012

(54) IMAGE PROCESSING SYSTEM, IMAGE PROCESSING APPARATUS, AND IMAGE PROCESSING METHOD

(75) Inventors: Shohei Nakagata, Kawasaki (JP); Kensuke Kuraki, Kawasaki (JP); Jun Takahashi, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/164,851

(22) Filed: Jun. 21, 2011

(65) Prior Publication Data

US 2011/0249300 A1 Oct. 13, 2011

Related U.S. Application Data

(63) Continuation of application No. PCT/JP2008/073856, filed on Dec. 26, 2008.

(51) Int. Cl.
*H04N 1/409* (2006.01)

(52) U.S. Cl. ....... 358/3.26; 358/448; 358/474; 382/100; 380/243

(58) Field of Classification Search .................. 358/3.26, 358/448, 474, 486; 382/100, 190; 380/243, 380/44, 285, 28, 84
See application file for complete search history.

(56) References Cited

U.S. PATENT DOCUMENTS

| | | | | |
|---|---|---|---|---|
| 4,797,735 A * | 1/1989 | Takai et al. | .................. | 348/192 |
| 5,351,107 A * | 9/1994 | Nakane et al. | .................. | 399/49 |
| 5,845,008 A * | 12/1998 | Katoh et al. | .................. | 382/217 |
| 6,289,125 B1 * | 9/2001 | Katoh et al. | .................. | 382/194 |
| 6,603,505 B1 * | 8/2003 | Kawada et al. | ............... | 348/192 |
| 7,155,051 B2 * | 12/2006 | Murakawa | ..................... | 382/135 |
| 7,199,819 B2 * | 4/2007 | Sugimoto et al. | ............ | 348/192 |
| 7,801,221 B2 * | 9/2010 | Montard et al. | ........... | 375/240.2 |
| 7,865,099 B2 * | 1/2011 | Kobayashi et al. | ............. | 399/55 |
| 8,094,205 B2 * | 1/2012 | Watanabe | .................. | 348/222.1 |
| 2006/0022206 A1 * | 2/2006 | Hayakawa et al. | ............. | 257/82 |
| 2006/0119879 A1 | 6/2006 | Nakai et al. | | |
| 2006/0140266 A1 * | 6/2006 | Montard et al. | ........... | 375/240.2 |
| 2007/0146689 A1 * | 6/2007 | Araki et al. | ................ | 356/124.5 |
| 2008/0137727 A1 * | 6/2008 | Murayama | ............... | 375/240.01 |
| 2009/0262931 A1 | 10/2009 | Nakagata et al. | | |
| 2009/0284450 A1 * | 11/2009 | Ishige et al. | .................... | 345/76 |

FOREIGN PATENT DOCUMENTS

| | | |
|---|---|---|
| JP | 3-276380 | 12/1991 |
| JP | 2000-30052 | 1/2000 |
| JP | 2006-165889 | 6/2006 |
| WO | 2008/053576 A1 | 5/2008 |

OTHER PUBLICATIONS

International Search Report for PCT/JP2008/073856, mailed Feb. 3, 2009.
Japanese Office Action mailed May 29, 2012 issued in corresponding Japanese Patent Application No. 2010-543748.

* cited by examiner

*Primary Examiner* — Negussie Worku
(74) *Attorney, Agent, or Firm* — Staas & Halsey LLP

(57) ABSTRACT

An image processing system includes: an image input unit which reads an image printed on a medium and generates electronic data representing the image; and a processing unit which corrects the image represented by the electronic data. The processing unit implements the functions of: detecting, from the image represented by the electronic data, a first pattern having a first size and shape that is attached to the image; measuring a degree of degradation by measuring an amount of displacement of the size of the detected first pattern from the first size; and correcting the image represented by the electronic data to reduce the degree of degradation.

9 Claims, 10 Drawing Sheets

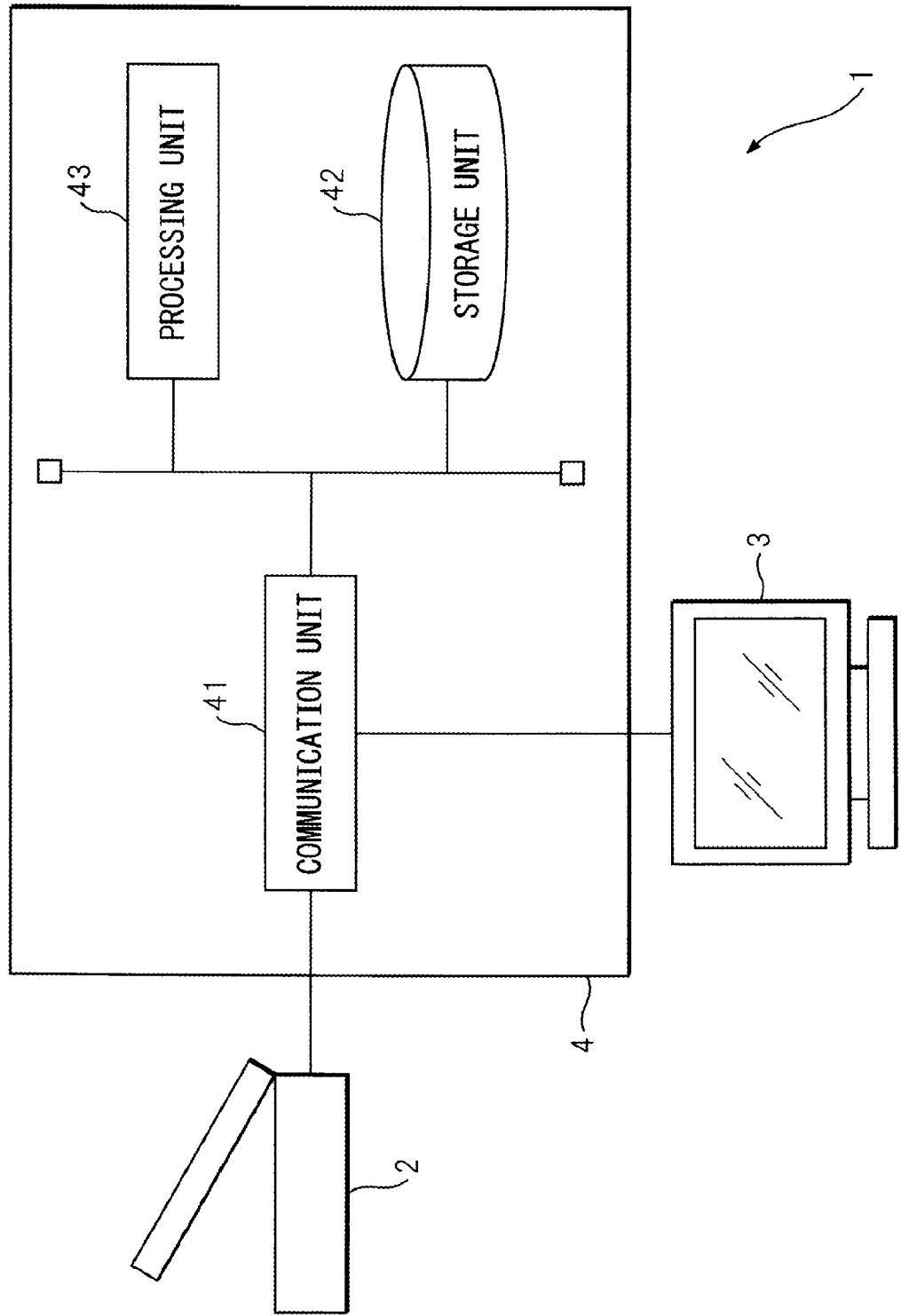

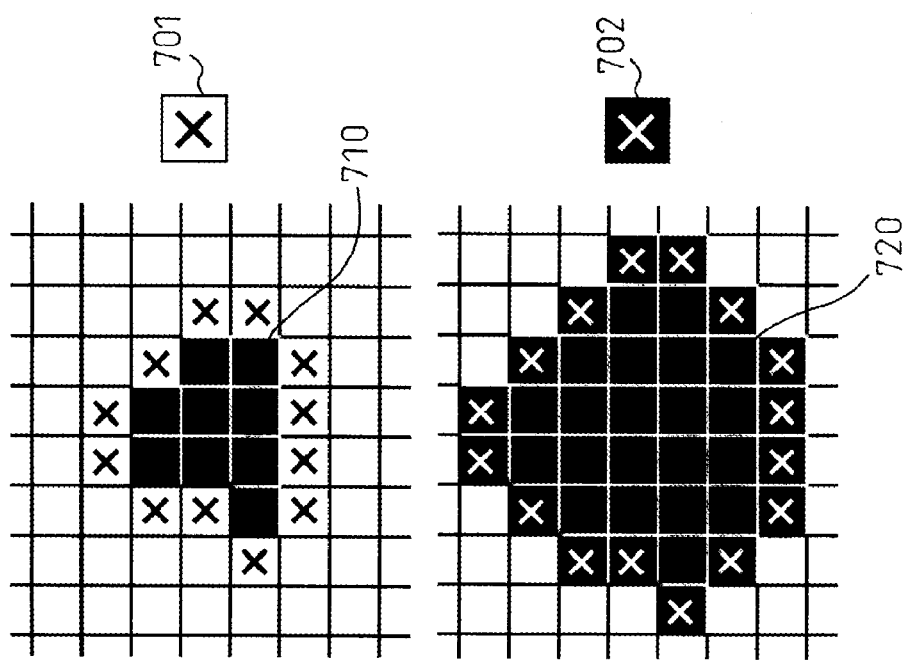
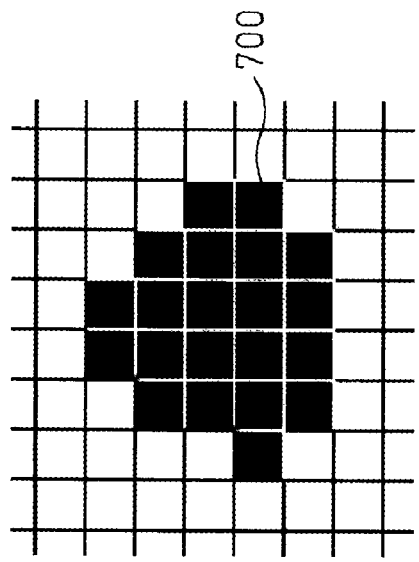
FIG.7A FIG.7B FIG.7C

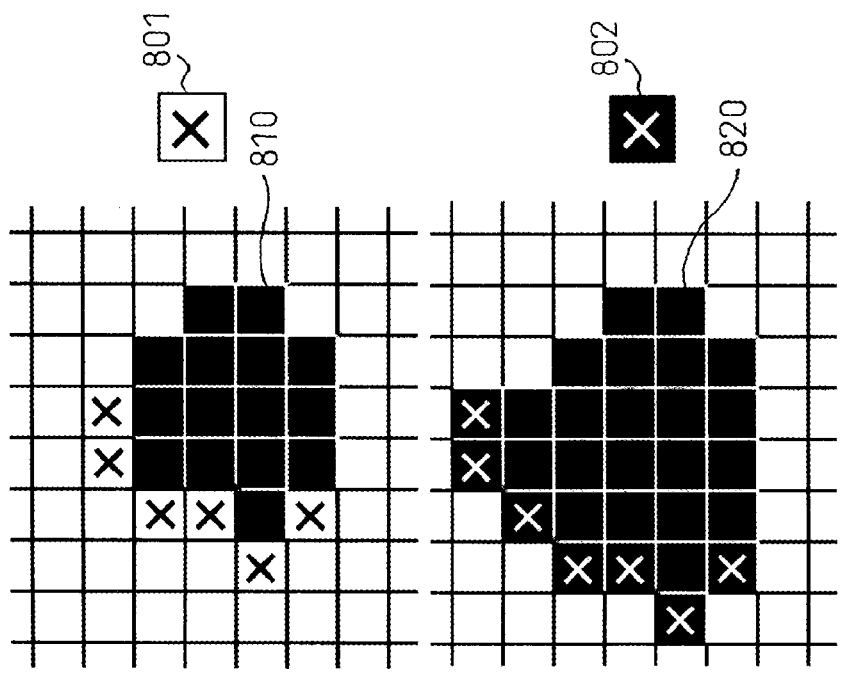
FIG.8B
FIG.8C
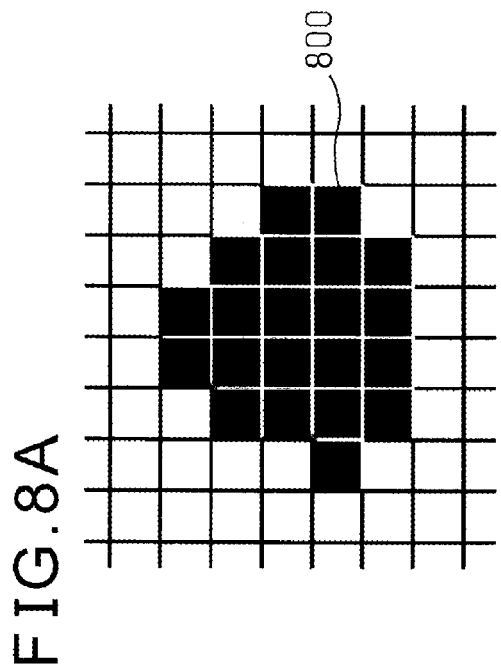
FIG.8A

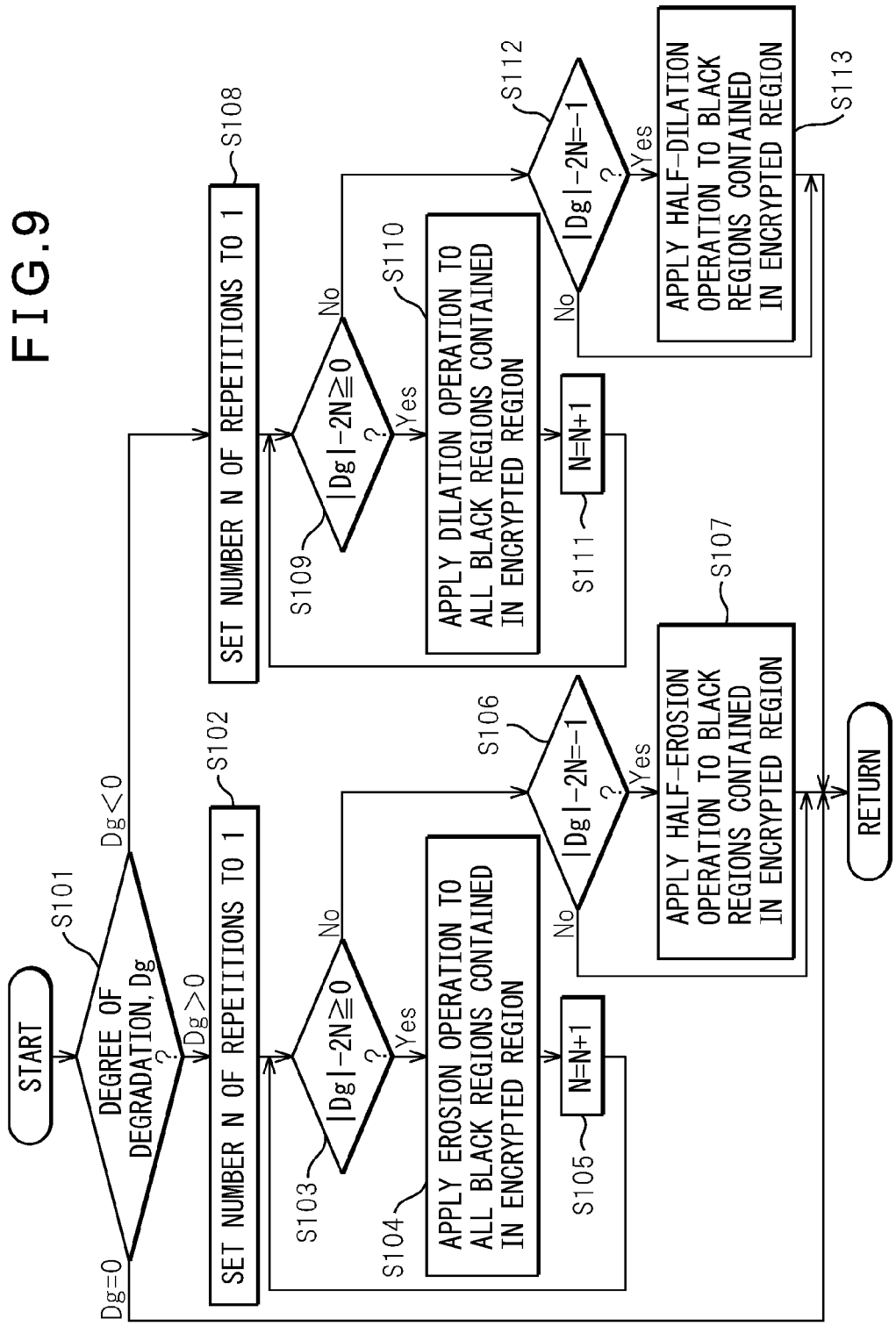

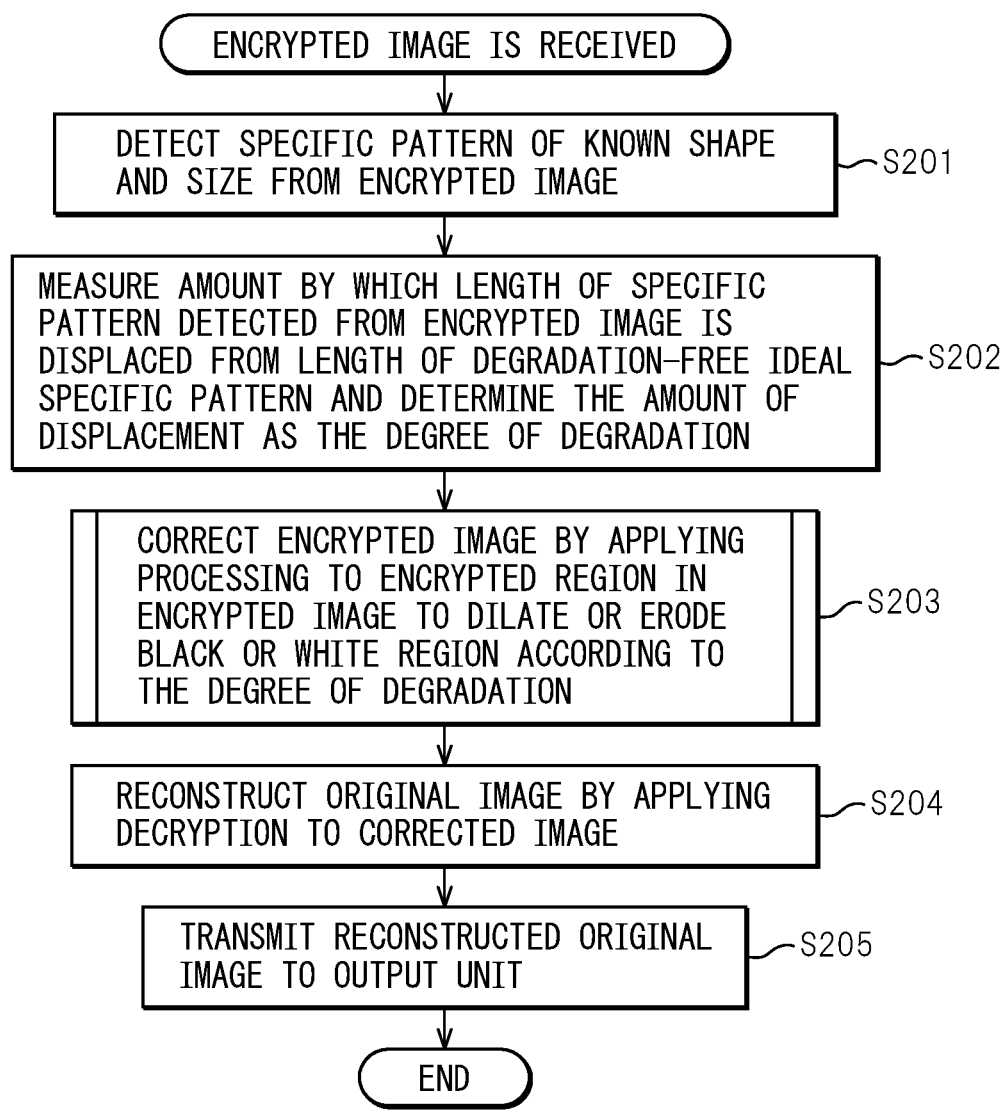

IMAGE PROCESSING SYSTEM, IMAGE PROCESSING APPARATUS, AND IMAGE PROCESSING METHOD

CROSS-REFERENCE TO RELATED APPLICATION

This application is a continuation application and is based upon PCT/JP2008/73856, filed on Dec. 26, 2008, the entire contents of which are incorporated herein by reference.

FIELD

The embodiments disclosed herein are related to an image processing system, an image processing apparatus, and an image processing method wherein, after an image printed on a medium is converted into electronic data, a correction is applied to the image represented by the electronic data.

BACKGROUND

Techniques for preventing secret information printed on a print medium from being leaked have been developed in recent years. Among others, techniques have been proposed in which an image that one does not want any unauthorized persons to see is encrypted in advance and the thus encrypted image is printed on a medium such as paper. An encryption device that uses one such technique first encrypts a portion of an input image and orderly converts the values of the pixels contained in the encrypted region, and then generates a unique pattern corresponding to the pixel value conversion. Further, the encryption device attaches a location marker for locating the encrypted region to at least two of the four corners of the encrypted region. The encryption device further attaches a checking marker which is used to verify the validity of the decrypted image obtained by decrypting the encrypted region. On the other hand, a decryption device, using a reading device such as a scanner, reads a medium on which the image having the encrypted region is printed, and recovers the original image by decrypting the encrypted region by referring to the location markers on the thus captured image.

Patent document 1: International Publication Pamphlet No. WO 2008/053576

SUMMARY

However, there are cases where the medium on which the image having the encrypted region is printed may be copied on a copying machine and the thus copied image may be read by a reading device and presented to the decryption device to decrypt the encrypted region. There are also cases where the medium on which the image having the encrypted region is printed may deteriorate, depending on the storage conditions of the medium. In such cases, noise will be superimposed on the image captured by reading the medium by the reading device. Further, noise may be superimposed on the captured image depending on the characteristics of the reading device such as a scanner or because of soiling of the optics of the reading device. When this happens, the values of the pixels contained in the encrypted region on the captured image may become different from the values of the corresponding pixels contained in the encrypted region originally generated by the encryption device. This can lead to a degradation in the image quality of the decrypted original image.

According to one embodiment, there is provided an image processing system. The image processing system includes: an image input unit which reads an image printed on a medium and generates electronic data representing the image; and a processing unit which corrects the image represented by the electronic data. The processing unit implements the functions of: detecting, from the image represented by the electronic data, a first pattern having a first size and shape that is attached to the image; measuring a degree of degradation by measuring an amount of displacement of the size of the detected first pattern from the first size; and correcting the image represented by the electronic data to reduce the degree of degradation.

According to another embodiment, there is provided an image processing method. The image processing method includes: reading an image printed on a medium and generating electronic data representing the image; detecting, from the image represented by the electronic data, a pattern having a designated size and shape that is attached to the image; measuring a degree of degradation by measuring an amount of displacement of the size of the detected pattern from the designated size; and correcting the image represented by the electronic data to reduce the degree of degradation.

According to still another embodiment, there is provided a computer program for causing a computer to perform an image correction process. The program causes the computer to implement the functions of: detecting, from an image represented by electronic data acquired by reading the image printed on a medium, a pattern having a designated size and shape that is attached to the image; measuring a degree of degradation by measuring an amount of displacement of the size of the detected pattern from the designated size; and correcting the image represented by the electronic data to reduce the degree of degradation.

According to yet another embodiment, there is provided an image processing apparatus. The image processing apparatus includes: a pattern detection unit which detects, from an image represented by electronic data acquired by reading the image printed on a medium, a pattern having a designated size and shape that is attached to the image; a degree-of-degradation measuring unit which measures a degree of degradation by measuring an amount of displacement of the size of the detected pattern from the designated size; and an image correcting unit which corrects the image represented by the electronic data to reduce the degree of degradation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram schematically illustrating the configuration of an image processing apparatus according to one embodiment.

FIG. 7A is a diagram illustrating one example of the black region contained in the encrypted region.

FIG. 7B is a diagram depicting the black region of FIG. 7A after an erosion operation is applied to the black region.

FIG. 7C is a diagram depicting the black region of FIG. 7A after a dilation operation is applied to the black region.

FIG. 8A is a diagram illustrating one example of the black region contained in the encrypted region.

FIG. 8B is a diagram depicting the black region of FIG. 8A after a half-erosion operation is applied to the upper and left edges of the black region.

FIG. 8C is a diagram depicting the black region of FIG. 8A after a half-dilation operation is applied to the upper and left edges of the black region.

FIG. 9 is an operation flowchart illustrating the correction process that a degraded image correcting unit performs under the control of a computer program executed on the processing unit in the image decryption device.

FIG. 10 is an operation flowchart illustrating the decryption process which includes the image correction process and which is performed under the control of the computer program executed on the processing unit in the image decryption device.

DESCRIPTION OF EMBODIMENTS

Figure 2A:
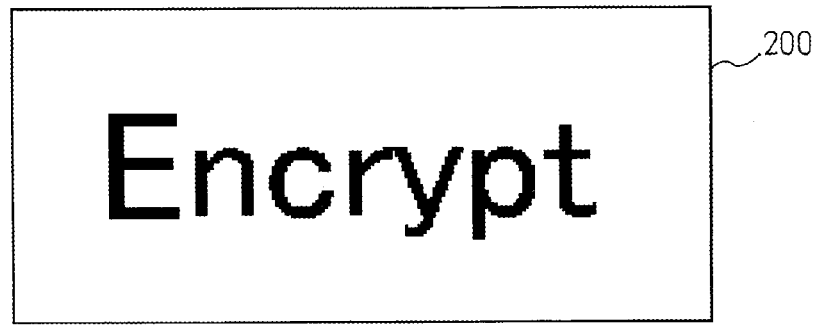
FIG. 2A is a diagram illustrating one example of an original image before encryption is applied.

An image processing system according to one embodiment will be described below with reference to the drawings. In this image processing system, an encrypted image printed on a medium is captured using a reading device and converted into electronic data, and the original image is reconstructed by decrypting the image represented by the electronic data. For this purpose, the image processing system detects from the image a mark of a known shape and size attached to the encrypted image, and obtains the difference between the size of the detected mark and the originally defined size of the mark. Then, the image processing system corrects the image represented by the electronic data to reduce the difference, and thereafter decrypts the corrected image, compensating for any degradation of the encrypted image caused by the deterioration of the medium or the noise introduced during image capturing.

In this specification, the image encrypted as described above is simply referred to as the "encrypted image."

FIG. 1 is a diagram schematically illustrating the configuration of the image processing system according to the one embodiment. The image processing system 1 includes an image input unit 2, an output unit 3, and an image decryption device 4.

The image input unit 2 includes, for example, a scanner or a camera. The image input unit 2 is connected to the image decryption device 4 via a communication line conforming, for example, to a communication standard such as Universal Serial Bus (USB) or Small Computer System Interface (SCSI).

The image input unit 2 reads the encrypted image printed on a medium such as paper, and converts the encrypted image into electronic data. Here, the image input unit 2 may perform noise elimination on the readout image by using any one of various known techniques. Further, if the encrypted image is a binary image, the image input unit 2 may perform binarization on the readout image. The image input unit 2 transmits the electronic data of the encrypted image to the image decryption device 4.

The output unit 3 includes, for example, a display device such as a liquid crystal display or a CRT, or a printing device such as a printer. The output unit 3 is connected to the image decryption device 4, and displays the original image reconstructed by the image decryption device 4 onto the display device or prints it on a medium such as paper.

The image decryption device 4 includes a communication unit 41, a storage unit 42, and a processing unit 43. The image decryption device 4 reconstructs the original image by decrypting the electronic data of the encrypted image received from the image input unit 2.

The communication unit 41 includes, for example, a communication interface for connecting the image decryption device 4 to the image input unit 2 and the output unit 3 or to some other peripheral device, and a control circuit for the interface. The communication interface for connecting to such peripheral devices may be an interface conforming, for example, to a communication standard such as USB or SCSI. The communication unit 41 may also include a communication interface for connecting to a communication network conforming to a communication standard such as Ethernet (registered trademark) or to an integrated services digital network (ISDN), and a control circuit for the interface. Then, the image decryption device 4 may transmit the decrypted original image to other apparatus via the communication unit 41.

The storage unit 42 includes at least one device selected, for example, from among a semiconductor memory, a magnetic disk device, and an optical disk device. The storage unit 42 stores a computer program to be executed within the image decryption device 4, parameters to be used for decrypting the encrypted image, and the decrypted original image or the encrypted image received from the image input unit 2. The storage unit 42 further stores parameters and data to be used for correcting the encrypted image.

The processing unit 43 includes one or a plurality of processors and their peripheral circuitry. The processing unit 43 reconstructs the original image by decrypting the electronic data of the encrypted image received from the image input unit 2. Further, the processing unit 43 controls the entire operation of the image processing system 1.

In order to facilitate understanding of the decryption process performed by the processing unit 43, one example of the encryption applied to the original image will be described below.

An encryption device which performs encryption first divides the region to be encrypted within the original image into a plurality of blocks, and assigns a unique number to each block. For example, the encryption device divides the region to be encrypted into three blocks vertically and four blocks horizontally, i.e., a total of 12 blocks, and assigns numbers 1 to 12 to the respective blocks. Next, the encryption device performs scrambling to rearrange the order of the blocks in a random manner by using an encryption key. For that purpose, the encryption device constructs a mapping table that defines a mapping between the positions of the blocks before and after the conversion by using the encryption key. For example, let x denote the block number before the conversion and y denote the block number after the conversion. Then, the block conversion equation corresponding to the scrambling is given by the following equation.

$$y = (px) \bmod q \quad (1)$$

In equation (1), p and q are primes used in the encryption key. For example, if p=7 and q=13, then when x is 1, the corresponding value of y is 7. Accordingly, the encryption device performs scrambling by moving the block whose block number x before the conversion is 1 to the position of the block whose block number y after the conversion is 7.

Next, the encryption device inverts the pixel values of pixels located in a prescribed position within each block after the conversion so that the decryption device can accurately detect the position of each block. The pixels located in the prescribed position within each block may be, for example, three pixels vertically and three pixels horizontally, located in the upper left corner of the block. The region containing the pixels whose pixel values are inverted will hereinafter be referred to as the inversion marker. For example, based on the average value of the pixels contained in the same block as the inversion marker and located in the neighborhood of the inversion marker, the encryption device selects either a shift operation or an inversion operation as the operation to be applied to the pixels contained in the inversion marker. The inversion operation is expressed by the following equation.

$$v = P_{max} - u + P_{min} \quad (2)$$

The shift operation is expressed by the following equation.

$$v = (u + (P_{max} - P_{min} + 1)/2 \bmod P_{max}) + P_{min} \quad (3)$$

In equations (2) and (3), $P_{max}$ denotes the maximum pixel value that each pixel in the image to be encrypted can take, and $P_{min}$ denotes the minimum pixel value that each pixel in the image to be encrypted can take. Further, u and v respectively represent the pixel values before and after the inversion of the inversion marker. Then, when $P_{max}$=255 and $P_{min}$=0, for example, if the average value $P_{av}$ of the pixels in the neighborhood of the inversion marker is not smaller than 64 but smaller than 192, the encryption device selects the shift operation, and if the average value $P_{av}$ is smaller than 64 or not smaller than 192, it selects the inversion operation.

For example, when the pixel value, u, of the pixels contained in the inversion marker is 20, and the average value $P_{av}$ of the pixels in the neighborhood of the inversion marker is 35, the encryption device selects the inversion operation, so that the pixel value, v, of the inversion marker after the inversion is calculated as 235 from equation (2).

Finally, the encryption device attaches check patterns in the four corners of the encrypted region. Preferably, the check patterns are patterns with which the decryption device can easily identify the encrypted region. For example, the check patterns may each be formed as a pattern in which rectangular regions having the maximum pixel value and rectangular regions having the minimum pixel value are arranged in alternating fashion. Alternatively, the check patterns may each be formed as a square-shaped pattern in which the pixels along the four sides of the square have the minimum pixel value and the pixels located inside thereof have the maximum pixel value.

The encryption device here is, for example, a computer. The encryption device performs the above scrambling, pixel value conversion, and check pattern attaching operations in accordance with a computer program that runs on the processor of the encryption device.

Figure 2B:
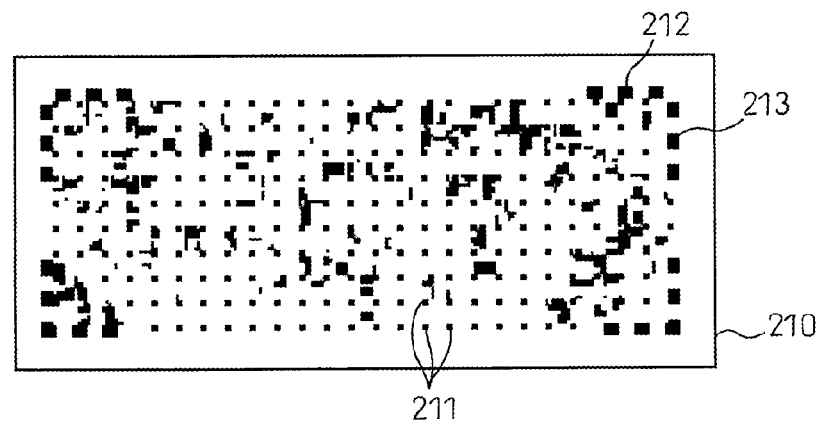
FIG. 2B is a diagram illustrating one example of an encrypted image obtained as a result of the encryption.

FIGS. 2A and 2B are diagrams illustrating respectively one example of the original image before encryption is applied and one example of the encrypted image obtained as a result of the encryption. As illustrated in FIG. 2A, the original image 200 is a binary image. In the original image 200, the portions corresponding to the character string "Encrypt" have pixel values different from those of the other portions. On the other hand, as illustrated in FIG. 2B, the encrypted image 210 is produced by changing the pixel positions on a block-by-block basis. As a result, a third party is unable to recognize from the encrypted image 210 that the character string "Encrypt" is contained in the original image 200. In the encrypted image 210, a plurality of inversion markers 211 indicating the positions of the blocks based on which the scrambling was applied are disposed in a grid-like pattern. Further, a horizontally oriented check pattern 212 and a vertically oriented check pattern 213 for identifying the encrypted region are attached to each of the four corners of the encrypted image 210.

Figure 2C:
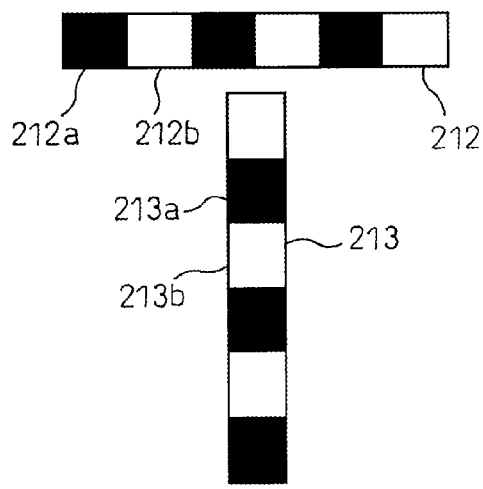
FIG. 2C is a diagram illustrating in enlarged form a check pattern attached to the encrypted image of FIG. 2B.

FIG. 2C is a diagram illustrating in enlarged form the check patterns 212 and 213 attached to the encrypted image 210 of FIG. 2B. As illustrated in FIG. 2C, the horizontally oriented check pattern 212 is a pattern in which rectangular regions 212a of the minimum pixel value and rectangular regions 212b of the maximum pixel value are arranged in alternating fashion at equally spaced intervals along the horizontal direction. On the other hand, the vertically oriented check pattern 213 is a pattern in which rectangular regions 213a of the minimum pixel value and rectangular regions 213b of the maximum pixel value are arranged in alternating fashion at equally spaced intervals along the vertical direction. For simplicity, a region made up of pixels having pixel values not larger than a given threshold value will hereinafter be referred to as the black region, while a region made up of pixels having pixel values larger than the given threshold value will be referred to as the white region. The given threshold value may be set somewhere between the maximum and minimum pixel values that the pixels in the encrypted image can take. For example, the given threshold value may be set by taking the mean value between the maximum and minimum pixel values that the pixels in the encrypted image can take.

As described above, the check patterns 212 and 213 and the inversion markers 211 have respectively characteristic patterns. As a result, the decryption device, which recovers the original image 200 from the encrypted image 210, can locate the position of each block by referring to the check patterns 212 and 213 and the inversion markers 211. Then, if the encrypted image 210 is not degraded, the decryption device can accurately reconstruct the original image 200 by first reinverting the pixel values of the inversion markers and then performing descrambling using the encryption key used to encrypt the original image 200.

However, if the medium on which the encrypted image is printed is soiled, or if the medium is copied and the encrypted image captured from the copied medium is read by the decryption device, the readout encrypted image is degraded.

Figure 3A:
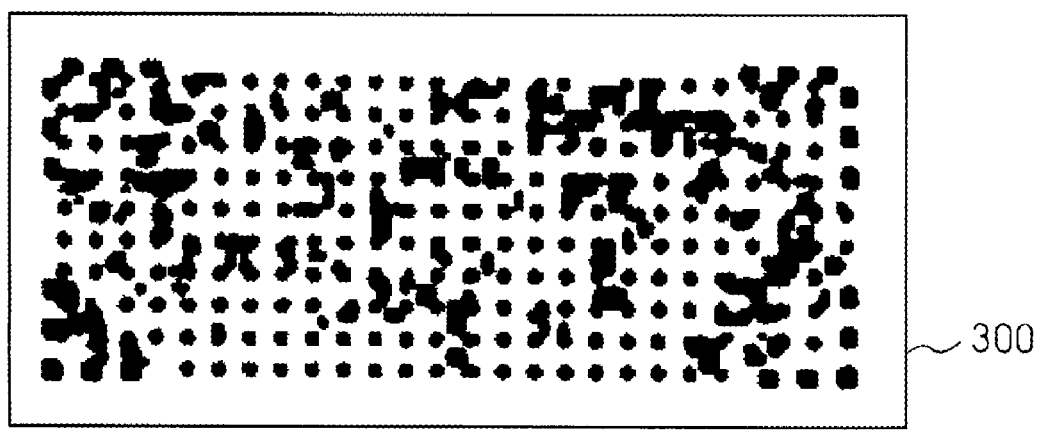
FIG. 3A is a diagram illustrating one example of a degraded encrypted image when a medium on which the encrypted image of FIG. 2B is printed is read by a scanner or a camera.
Figure 3B:
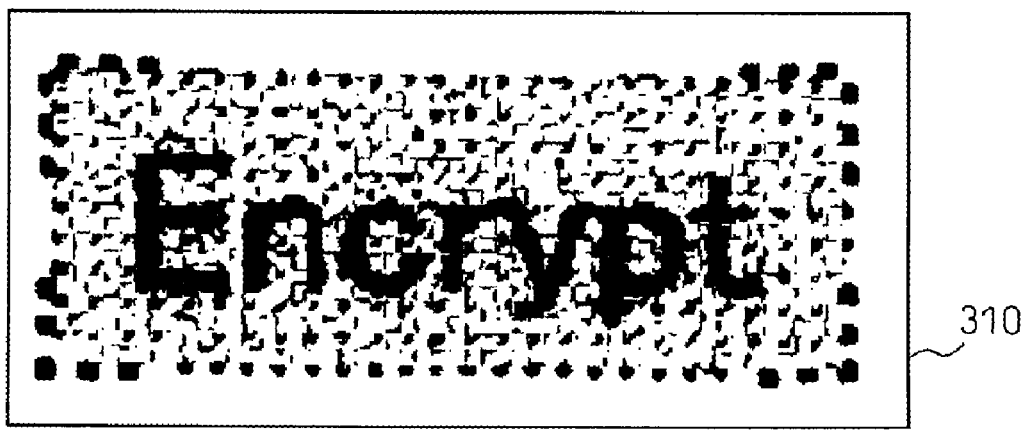
FIG. 3B is a diagram illustrating one example of a decrypted image when the degraded encrypted image of FIG. 3A is decrypted by a prior art decryption device.

FIG. 3A illustrates one example of a degraded encrypted image when the medium on which the encrypted image 210 of FIG. 2B is printed is read by a scanner or a camera. FIG. 3B illustrates one example of a decrypted image when the degraded encrypted image of FIG. 3A is decrypted by a prior art decryption device. As illustrated in FIG. 3A, the black regions in the degraded encrypted image 300 are expanded compared with the corresponding regions in the encrypted image 210. Therefore, when the degraded encrypted image 300 is decrypted by the prior art decryption device, the result is a low-quality decrypted image containing a lot of noise compared with the original image 200, as can be seen from the decrypted image 310 depicted in FIG. 3B.

In view of this, the processing unit 43 in the image processing system 1 according to the present embodiment applies a correction to the encrypted image represented by the electronic data received from the image input unit 2, and reconstructs the original image by decrypting the corrected image.

Figure 4:
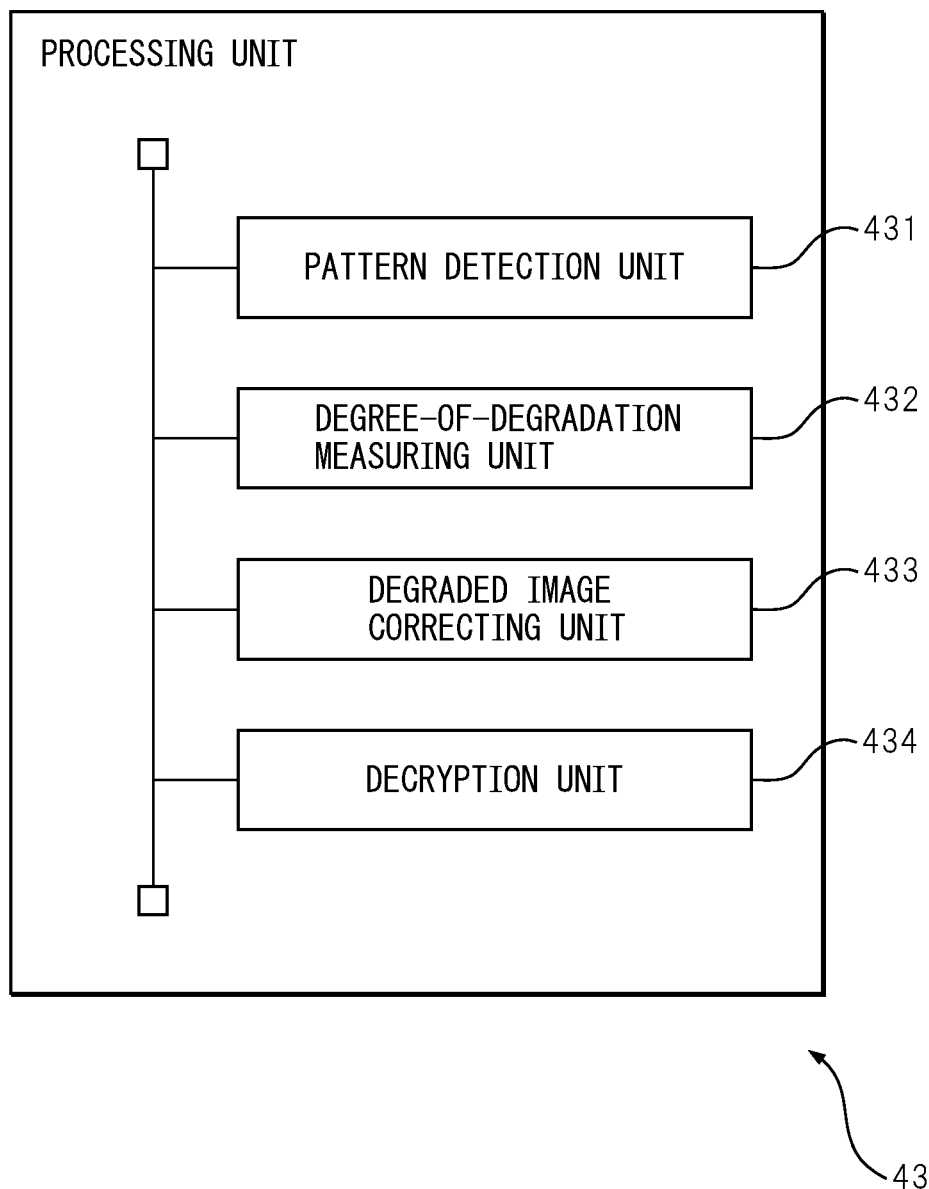
FIG. 4 is a functional block diagram of a processing unit, illustrating the functions implemented in order to execute the image correction of the encrypted image and the decryption of the corrected image.

FIG. 4 is a functional block diagram of the processing unit 43, illustrating the functions implemented in order to execute the image correction of the encrypted image and the decryption of the corrected image. As illustrated in FIG. 4, the processing unit 43 includes a pattern detection unit 431, a degree-of-degradation measuring unit 432, a degraded image correcting unit 433, and a decryption unit 434. These units incorporated in the processing unit 43 are functional modules implemented by a computer program executed on the processor of the processing unit 43. In the processing unit 43, the image correction is performed using the pattern detection unit 431, the degree-of-degradation measuring unit 432, and the degraded image correcting unit 433.

From the encrypted image represented by the electronic data received from the image input unit 2, the pattern detection unit 431 detects a specific pattern of known size and shape that serves as a reference based on which the amount of correction is determined. In the present embodiment, the pattern detection unit 431 detects as the specific pattern the check pattern that indicates the boundary of the encrypted region. The check pattern has also to be detected in order to identify the encrypted region. Accordingly, once the check pattern has been detected as the specific pattern by the pattern detection unit 431, there is no need to once again detect the check pattern in order to identify the encrypted region. The processing unit 43 can thus eliminate the need for the pattern detection performed to identify the encrypted region.

The pattern detection unit 431 can detect the check pattern by using, for example, the technique of template matching or edge detection.

When detecting the check pattern by template matching, a template describing a pattern identical to the check pattern is prestored in the storage unit 42. To detect the check pattern from the encrypted image, the pattern detection unit 431 retrieves the template from the storage unit 42. Then, the pattern detection unit 431 calculates correlation between the retrieved template and a selected region of the encrypted image that is assumed to contain the check pattern on the encrypted image, and searches for the position on the encrypted image at which the correlation value becomes maximum. The pattern detection unit 431 determines that the position on the encrypted image at which the correlation value has become maximum contains the check pattern. The correlation value can be obtained, for example, by dividing the number of pixels whose pixel values match between the encrypted image and the template by the number of pixels in the template.

On the other hand, when detecting the check pattern by edge detection, the pattern detection unit 431 extracts edge pixels by performing edge detection on the encrypted image. Then, the pattern detection unit 431 detects the position where there is a continuous run of edge pixels extending vertically by a length equal to the vertical contour length of the black region or white region contained in the check pattern and there is also a continuous run of edge pixels extending horizontally by a length equal to the horizontal contour length of the black region or white region contained in the check pattern. Then, the pattern detection unit 431 may determine that the check pattern is located in the thus detected position.

Alternatively, the pattern detection unit 431 extracts edge pixels by performing edge detection on the encrypted image. Then, the pattern detection unit 431 may detect the check pattern by performing template matching between an edge image representing the extracted edge pixels and a template describing the contour shape of the black region or white region contained in the check pattern.

When the encrypted image has a plurality of check patterns, the pattern detection unit 431 detects at least one of the check patterns. For example, when the horizontally oriented check pattern 212 and the vertically oriented check pattern 213 are attached to each of the four corners of the encrypted image, as illustrated in FIGS. 2B and 2C, the pattern detection unit 431 may detect all of the check patterns. Alternatively, the pattern detection unit 431 may only detect the horizontally oriented check pattern 212 and the vertically oriented check pattern 213 attached to one of the four corners. Further alternatively, the pattern detection unit 431 may detect only the horizontally oriented check pattern 212 or the vertically oriented check pattern 213 attached to one of the four corners.

The pattern detection unit 431 passes information indicating the position of the detected check pattern on to the degree-of-degradation measuring unit 432. The information indicating the position of the check pattern includes, for example, the coordinates of the pixel located at one of the corners of the check pattern.

The degree-of-degradation measuring unit 432 measures the degree of degradation of the encrypted image by calculating the difference between the size of the specific pattern detected from the encrypted image and the size of a degradation-free pattern corresponding to that specific pattern. The following description is given by assuming that the specific pattern detected by the pattern detection unit 431 is the check pattern.

Generally, the larger the degree of degradation of the encrypted image captured by the image input unit 2, the larger the number of pixels in the encrypted image that have pixel values different from those of the pixels in a degradation-free encrypted image. For example, when the medium on which the encrypted image is printed is copied, the encrypted image carried on the copied medium may become dark as a whole. In this case, the pixel values of the pixels in the encrypted image captured by the image input unit 2 by reading the copied medium become lower as a whole. As a result, when binarization is performed on the encrypted image represented by the electronic data captured by the image input unit 2 by reading the copied medium, as is the case when the encrypted image is a binary image, the encrypted image thus binarized may contain a larger number of pixels having lower pixel values than the degradation-free encrypted image. Conversely, if the encrypted image carried on the copied medium becomes light as a whole, the pixel values of the pixels in the encrypted image captured by the image input unit 2 by reading the copied medium become higher as a whole. As a result, when binarization is performed on the encrypted image represented by the electronic data captured by the image input unit 2 by reading the medium, the encrypted image thus binarized may contain a larger number of pixels having higher pixel values than the degradation-free encrypted image.

Figure 5B:
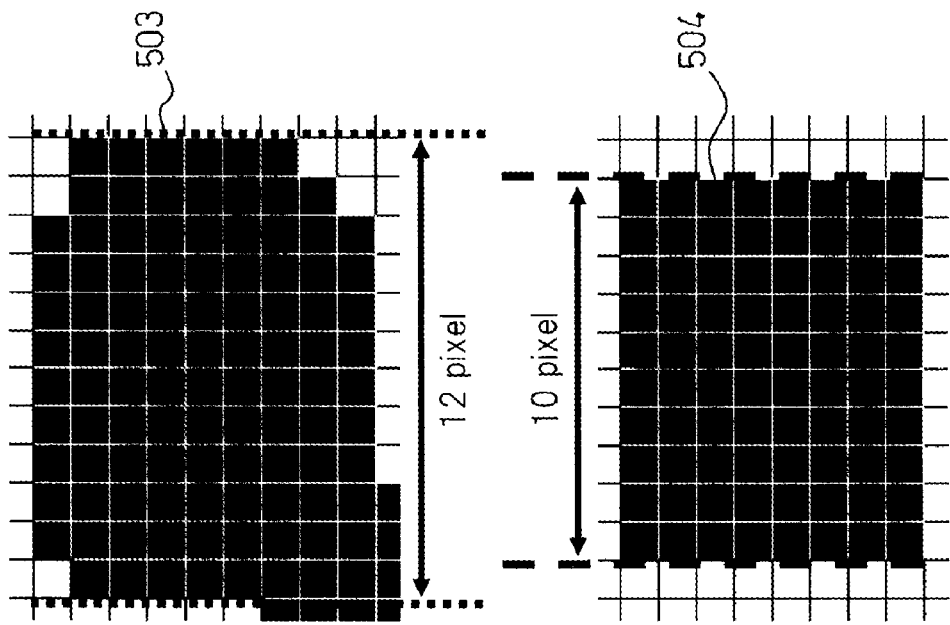
FIG. 5B is an enlarged view of a black region located at the right edge of each of the check patterns depicted in FIG. 5A.

This will be explained with reference to FIGS. 5A and 5B.

Figure 5A:
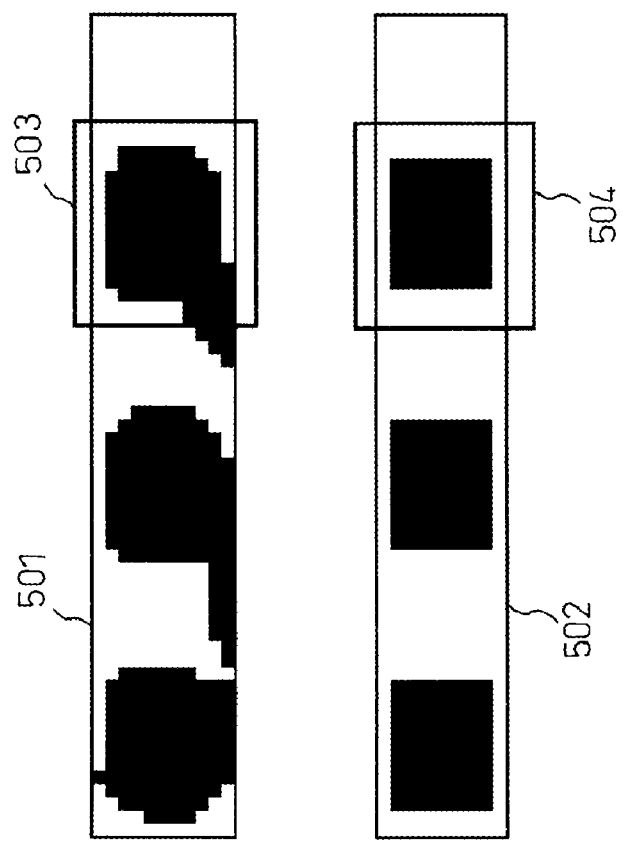
FIG. 5A is a diagram illustrating an example of a degraded horizontally oriented check pattern detected from the degraded encrypted image depicted in FIG. 3A and an example of an ideal horizontally oriented check pattern free from degradation.

FIG. 5A is a diagram illustrating an example of a degraded horizontally oriented check pattern detected from the degraded encrypted image depicted in FIG. 3A and an example of an ideal horizontally oriented check pattern free from degradation. In FIG. 5A, the pattern 501 in the upper half indicates the check pattern detected from the degraded encrypted image captured by the image input unit 2, and the pattern 502 in the lower half indicates the degradation-free ideal check pattern. FIG. 5B is an enlarged view of the black region located at the right edge of each of the check patterns depicted in FIG. 5A. In FIG. 5B, the black region 503 is an enlarged view of the black region 503 located at the right edge of the check pattern 501, and the black region 504 is an enlarged view of the black region 504 located at the right edge of the degradation-free check pattern 502. As illustrated in FIGS. 5A and 5B, the black region 504 in the degradation-free check pattern 502 is 10 pixels long horizontally. On the other hand, the black region 503 in the degraded check pattern 501 is 12 or more pixels long horizontally.

The degree-of-degradation measuring unit 432 obtains the degree of degradation in the horizontal direction by calculating, for example, the difference between the horizontal length of the black region contained in the check pattern detected from the encrypted image captured by the image input unit 2 and the horizontal length of the black region contained in the degradation-free check pattern. That is, the degree-of-degradation measuring unit 432 obtains the degree of degradation by measuring the amount by which the length of the check pattern detected from the encrypted image captured by the image input unit 2 is displaced from the length of the degradation-free check pattern. For clarity, the check pattern detected from the encrypted image captured by the image input unit 2 will hereinafter be referred to as the detected check pattern, as opposed to the degradation-free ideal check pattern which will hereinafter be referred to as the ideal check pattern.

The degree-of-degradation measuring unit 432 detects the left and right edges of the black region in order to obtain the horizontal length of the black region contained in the detected check pattern. For this purpose, the degree-of-degradation measuring unit 432 calculates, using the following equation, the value D(x−x1) which represents the sum of the differences between horizontally adjacent pixels on a column-by-column basis.

$$D(x-x1)=\Sigma_{y=y1}^{y1+(H-1)}(g(x+1,y)-g(x, y)) \quad (4)$$

$$x \in \{x1, x1+1, x1+2, \ldots, x1+W-1\}$$

Here, x and y denote the coordinate values in the horizontal and vertical directions, respectively. The coordinates (x1, y1) are the coordinates of the upper left edge of the search region containing the detected check pattern, and the coordinates (x1+W, y1+H) are the coordinates of the lower right edge of the search region containing the detected check pattern. Further, g(x, y) represents the pixel value of the pixel located at the coordinates (x, y) contained in the search region.

Figure 6:
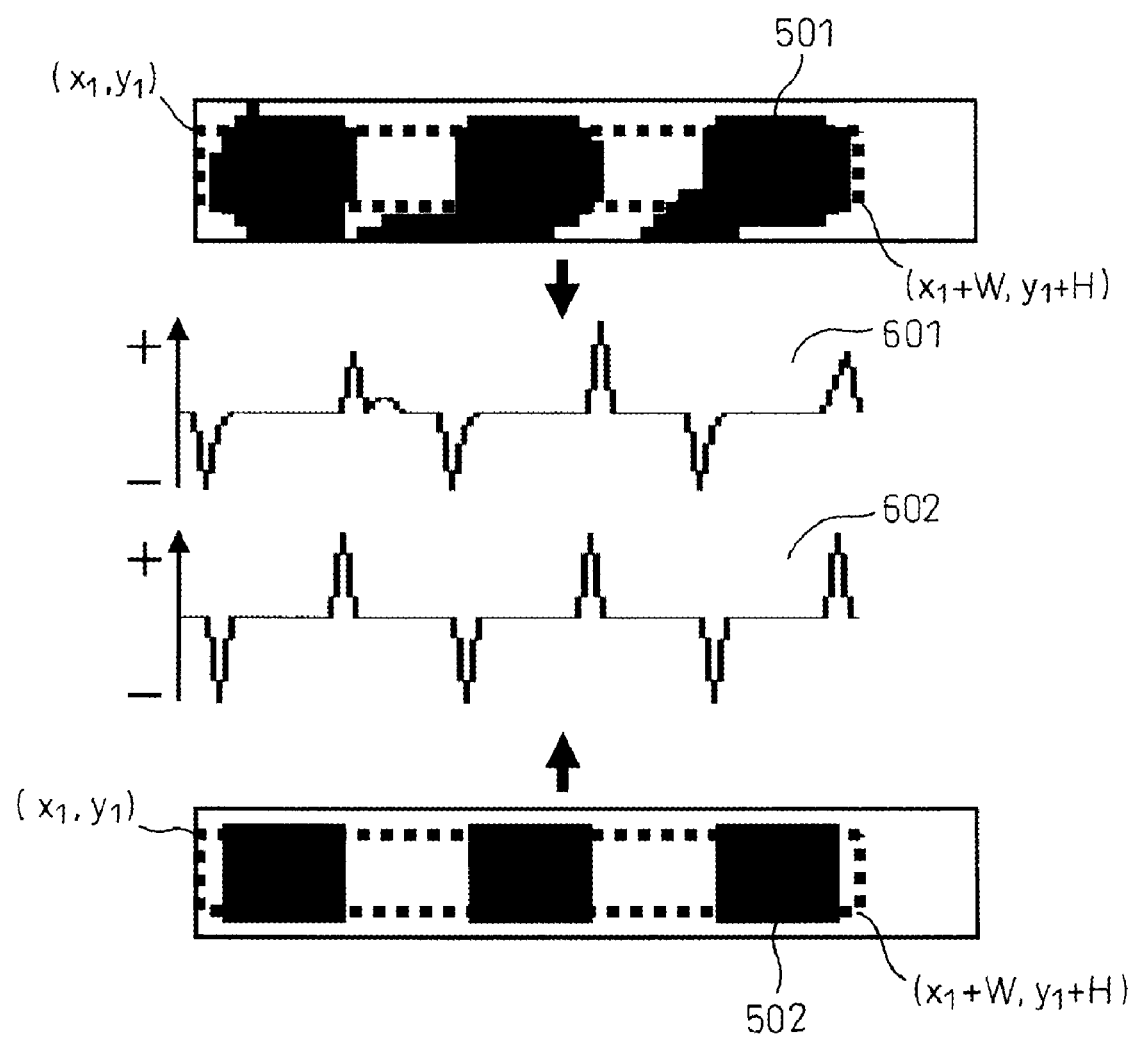
FIG. 6 is a diagram illustrating the sum of the differences between horizontally adjacent pixels on a column-by-column basis for each of the detected check pattern and the ideal check pattern depicted in FIG. 5A.

FIG. 6 is a diagram illustrating the sum of the differences between horizontally adjacent pixels on a column-by-column basis for each of the detected check pattern 501 and the ideal check pattern 502 depicted in FIG. 5A. In FIG. 6, graph 601 represents the sum D(x−x1) of the differences between horizontally adjacent pixels on a column-by-column basis for the detected check pattern 501 depicted at the top of the figure. On the other hand, graph 602 represents the sum Di(x−x1) of the differences between horizontally adjacent pixels on a column-by-column basis for the ideal check pattern 502 depicted at the bottom of the figure. Di(x−x1) is also calculated using equation (4).

As depicted by the graphs 601 and 602, the sums D(x−x1) and Di(x−x1) both exhibit a minimum value at the left edge of each black region. On the other hand, at the right edge of each black region, the sums D(x−x1) and Di(x−x1) both exhibit a maximum value. As can be seen, the minimum and maximum values appear alternately and cyclically on the graphs 601 and 602.

Therefore, the degree-of-degradation measuring unit 432 examines the values of the sum D(x−x1) in sequence, starting from the coordinate x1 at the left edge of the search region and proceeding toward the right. The degree-of-degradation measuring unit 432 determines that the horizontal coordinate $X_L$ at which the sum D(x−x1) reaches a first minimum represents the left edge of the black region. Next, the degree-of-degradation measuring unit 432 determines that the horizontal coordinate $X_R$ at which the sum D(x−x1) reaches a maximum represents the right edge of the black region. In this way, the degree-of-degradation measuring unit 432 sequentially detects the horizontal coordinates at which the sum D(x−x1) reaches a minimum and a maximum, respectively.

Alternatively, the degree-of-degradation measuring unit 432 may perform pattern matching between D(x−x1) obtained from the detected check pattern 501 and Di(x−x1) obtained from the ideal check pattern 502 and thereby detect the horizontal coordinates of D(x−x1) that respectively correspond to the minimum and maximum values of Di(x−x1). In this case, the degree-of-degradation measuring unit 432 determines that the horizontal coordinate $X_L$ of D(x−x1) corresponding to the minimum value of Di(x−x1) represents the left edge of the black region, and that the horizontal coordinate $X_R$ of D(x−x1) corresponding to the maximum value of Di(x−x1) represents the right edge of the black region. Preferably, the degree-of-degradation measuring unit 432 employs the technique of pattern matching that uses dynamic programming. By so doing, the degree-of-degradation measuring unit 432 can efficiently calculate the degree of matching between D(x−x1) and Di(x−x1) even when the width of the black region contained in the detected check pattern 501 is different from the width of the black region contained in the ideal check pattern 502.

The degree-of-degradation measuring unit 432 calculates the average value of the distances between the left and right edges of the respective black regions contained in the detected check pattern 501. Then, the degree-of-degradation measuring unit 432 determines the degree of degradation in the horizontal direction by calculating the difference between the average value and the width of the black region contained in the ideal check pattern 502. For example, if the average value of the distances between the left and right edges of the respective black regions contained in the detected check pattern 501 is 12, and the width of the black region contained in the ideal check pattern 502 is 10, then the degree of degradation in the horizontal direction is given as +2. Similarly, if the average value of the distances between the left and right edges of the respective black regions contained in the detected check pattern 501 is 9, and the width of the black region contained in the ideal check pattern 502 is 10, then the degree of degradation in the horizontal direction is given as −1.

Further, the degree-of-degradation measuring unit 432 obtains the degree of degradation in the vertical direction by calculating the difference between the vertical length of the black region contained in the vertically oriented check pattern detected from the encrypted image captured by the image input unit 2 and the vertical length of the black region contained in the degradation-free vertically oriented check pattern.

Then, using the same equation as the above equation (4) except that x and y are interchanged, the degree-of-degradation measuring unit 432 can calculate the value $D(y-y1)$ which represents the sum of the differences between vertically adjacent pixels on a row-by-row basis. Next, in a manner similar to that described above, the degree-of-degradation measuring unit 432 determines that the position corresponding to the minimum value of $D(y-y1)$ represents the upper edge of the black region contained in the detected check pattern. Further, the degree-of-degradation measuring unit 432 determines that the position corresponding to the maximum value of $D(y-y1)$ represents the lower edge of the black region contained in the detected check pattern. The degree-of-degradation measuring unit 432 can thus calculate the distance between the upper and lower edges of the black region. Then, the degree-of-degradation measuring unit 432 determines the degree of degradation in the vertical direction by calculating the difference between the average value of the distance and the vertical length of the black region contained in the ideal check pattern.

Alternatively, the degree-of-degradation measuring unit 432 may determine the degree of degradation by calculating the difference between the horizontal/vertical length of the white region contained in the detected check pattern and the horizontal/vertical length of the white region contained in the degradation-free check pattern. In this case also, the degree-of-degradation measuring unit 432 calculates $D(x-x1)$ and $D(y-y1)$ from the detected check pattern by using the above equation (4) and the equation created by interchanging x and y in the equation (4). The degree-of-degradation measuring unit 432 determines that the position corresponding to the maximum value of $D(x-x1)$ represents the left edge of the white region, and that the position corresponding to the minimum value of $D(x-x1)$ that is adjacent to the right of the maximum value represents the right edge of the white region. Then, the degree-of-degradation measuring unit 432 calculates the average value of the distance between the left and right edges of the white region, and determines the degree of degradation in the horizontal direction by calculating the difference between the average value and the horizontal length of the white region contained in the ideal check pattern. Similarly, the degree-of-degradation measuring unit 432 determines that the position corresponding to the maximum value of $D(y-y1)$ represents the upper edge of the white region, and that the position corresponding to the minimum value of $D(y-y1)$ that is adjacent downward of the maximum value represents the lower edge of the white region. Then, the degree-of-degradation measuring unit 432 calculates the average value of the distance between the upper and lower edges of the white region, and determines the degree of degradation in the vertical direction by calculating the difference between the average value and the vertical length of the white region contained in the ideal check pattern.

By performing the above process, the degree-of-degradation measuring unit 432 obtains the degree of degradation in the horizontal direction for each of the four horizontally oriented check patterns 212 attached to the respective corners of the encrypted region. Further, by performing the above process, the degree-of-degradation measuring unit 432 obtains the degree of degradation in the vertical direction for each of the four vertically oriented check patterns 213 attached to the respective corners of the encrypted region. Then, the degree-of-degradation measuring unit 432 takes the average of the degrees of degradation calculated for all the horizontally and vertically oriented check patterns, rounds off any fractions of the average value, and determines the thus obtained value as the degree of degradation, Dg, for the encrypted image captured by the image input unit 2. The degree-of-degradation measuring unit 432 may determine the degree of degradation, Dg, based only on the check pattern attached to one of the four corners of the encrypted region. Alternatively, the degree-of-degradation measuring unit 432 may determine the degree of degradation, Dg, by taking the average of the degrees of degradation in the horizontal and vertical directions obtained from the check patterns attached to two or three of the four corners of the encrypted region. Further alternatively, the degree-of-degradation measuring unit 432 may determine the degree of degradation, Dg, by taking the average of the degrees of degradation in the horizontal direction obtained from the horizontally oriented check patterns or by taking the average of the degrees of degradation in the vertical direction obtained from the vertically oriented check patterns.

The degree-of-degradation measuring unit 432 passes the thus obtained degree of degradation, Dg, to the degraded image correcting unit 433.

To correct the encrypted image captured by the image input unit 2, the degraded image correcting unit 433 applies processing to the encrypted region in the encrypted image to dilate or erode the black or white region according to the degree of degradation, Dg. The processing performed to dilate the black region is such that when the attention pixel is a pixel contained in the black region, the neighboring pixels (for example, four neighbors) of the attention pixel are examined and any pixel contained in the white region is included into the black region by changing its pixel value to the same value as the attention pixel. On the other hand, the processing performed to erode the black region is such that when the attention pixel is a pixel contained in the white region, the neighboring pixels (for example, four neighbors) of the attention pixel are examined and any pixel contained in the black region is included into the white region by changing its pixel value to the same value as the attention pixel.

The processing performed to dilate the white region is the same as the processing performed to erode the black region. Likewise, the processing performed to erode the white region is the same as the processing performed to dilate the black region.

For example, when the degree of degradation, Dg, obtained for the black region is 2N (where N is an integer not smaller than 0), the degraded image correcting unit 433 applies an erosion N times to the entire black region contained in the encrypted region of the encrypted image. As a result of this processing, the vertical and horizontal lengths of the black region contained in the encrypted region are each made to shrink by 2N pixels. On the other hand, when the degree of degradation, Dg, obtained for the black region is 2N+1 (where N is an integer not smaller than 0), the degraded image correcting unit 433 applies an erosion N times to the entire black region contained in the encrypted region of the encrypted image. After that, the degraded image correcting unit 433 applies an erosion one more time only to the upper or lower edge and the left or right edge of the black region. In this specification, the erosion operation applied only to the upper or lower edge and the left or right edge of the black region is called the half-erosion operation. More specifically, when the attention pixel is a pixel contained in the white region, the degraded image correcting unit 433 selects one of the pixels adjacent to the upper and lower sides of the attention pixel and one of the pixels adjacent to the left and right sides of the attention pixel, and takes the selected pixels as the pixels whose pixel values are to be changed. Then, when the selected pixels are pixels contained in the black region, the degraded image correcting unit 433 changes their pixel values to the same value as the attention pixel. As a result of this processing, the vertical and horizontal lengths of the black region contained in the encrypted region each shrink by (2N+1) pixels.

Since the black region can be eroded, as described above, by an amount equal to the amount expanded due to degradation, the degraded image correcting unit 433 can bring the encrypted image closer to the degradation-free state. When the pattern detection unit 431 detects the check pattern as the specific pattern, the encrypted region is identified by the detected check pattern. When the pattern detection unit 431 does not detect the check pattern, the degraded image correcting unit 433 can identify the encrypted region by detecting the check pattern by performing the same processing as that described earlier in connection with the pattern detection unit 431.

When the degree of degradation, Dg, obtained for the black region is −2N (where N is an integer not smaller than 0), for example, the degraded image correcting unit 433 applies a dilation N times to the entire black region contained in the encrypted region of the encrypted image. As a result of this processing, the vertical and horizontal lengths of the black region contained in the encrypted region are each expanded by 2N pixels. On the other hand, when the degree of degradation, Dg, obtained for the black region is −(2N+1) (where N is an integer not smaller than 0), the degraded image correcting unit 433 applies a dilation N times to the entire black region contained in the encrypted region of the encrypted image. After that, the degraded image correcting unit 433 applies a dilation one more time only to the upper or lower edge and the left or right edge of the black region. In this patent specification, the dilation operation applied only to the upper or lower edge and the left or right edge of the black region is called the half-dilation operation. More specifically, when the attention pixel is a pixel contained in the black region, the degraded image correcting unit 433 selects one of the pixels adjacent to the upper and lower sides of the attention pixel and one of the pixels adjacent to the left and right sides of the attention pixel, and takes the selected pixels as the pixels whose pixel values are to be changed. Then, when the selected pixels are pixels contained in the white region, the degraded image correcting unit 433 changes their pixel values to the same value as the attention pixel. As a result of this processing, the vertical and horizontal lengths of the black region contained in the encrypted region are each expanded by (2N+1) pixels.

Since the black region can be expanded, as described above, by an amount equal to the amount diminished due to degradation, the degraded image correcting unit 433 can bring the encrypted image closer to the degradation-free state.

Similarly, when the degree of degradation is obtained for the white region, the degraded image correcting unit 433 performs processing on the white region contained in the encrypted region of the encrypted image in the same manner as the processing is performed when the degree of degradation is obtained for the black region.

Further, the degraded image correcting unit 433 may perform a morphological dilation operation instead of the above dilation operation. Further, the degraded image correcting unit 433 may perform a morphological erosion or thinning operation instead of the above erosion operation. By performing the thinning operation instead of the above erosion operation, the degraded image correcting unit 433 can prevent a black or white region only one pixel wide from disappearing.

FIG. 7A is a diagram illustrating one example of the black region contained in the encrypted region. FIGS. 7B and 7C are diagrams depicting black regions 710 and 720 after the erosion operation and the dilation operation, respectively, are applied to the black region 700 depicted in FIG. 7A. In FIGS. 7A to 7C, the pixels contained in the black regions 700 to 720 are depicted as black pixels, and the other pixels are depicted as white pixels. As illustrated in FIG. 7B, when the degraded image correcting unit 433 applies the erosion operation to the black region 700, the pixel value of each pixel 701 located on the outer periphery of the black region 700 is changed to the same value as its neighboring pixel located outside the black region. Each pixel 701 is thus excluded from the black region 710. As a result, the width and height of the black region 710 are smaller by two pixels than the width and height of the black region 700.

On the other hand, as illustrated in FIG. 7C, when the degraded image correcting unit 433 applies the dilation operation to the black region 700, the pixel value of each pixel 702 adjacent to the outer periphery of the black region 700 is changed to the same value as its neighboring pixel contained in the black region. Each pixel 702 is thus included into the black region 720. As a result, the width and height of the black region 720 are larger by two pixels than the width and height of the black region 700.

FIG. 8A is a diagram illustrating one example of the black region contained in the encrypted region. FIGS. 8B and 8C are diagrams depicting black regions 810 and 820 after the half-erosion operation and the half-dilation operation, respectively, are applied to the upper and left edges of the black region 800 depicted in FIG. 8A. In FIGS. 8A to 8C, the pixels contained in the black regions 800 to 820 are depicted as black pixels, and the other pixels are depicted as white pixels. As illustrated in FIG. 8B, when the degraded image correcting unit 433 applies the half-erosion operation to the black region 800, the pixel value of each pixel 801 located at the left or upper edge of the black region 800 is changed to the same value as its neighboring pixel located outside the black region. Each pixel 801 is thus excluded from the black region 810. As a result, the width and height of the black region 810 are smaller by one pixel than the width and height of the black region 800.

On the other hand, as illustrated in FIG. 8C, when the degraded image correcting unit 433 applies the half-dilation operation to the black region 800, the pixel value of each pixels 802 located at the left or upper edge of the black region 800 is changed to the same value as its neighboring pixel contained in the black region. Each pixel 802 is thus included into the black region 820. As a result, the width and height of the black region 820 are larger by one pixel than the width and height of the black region 800.

FIG. 9 is an operation flowchart illustrating the correction process that the degraded image correcting unit 433 performs under the control of a computer program executed on the processing unit 43 in the image decryption device 4. The operation flow of the correction process will be described below for the case where the degraded image correcting unit 433 applies the dilation or erosion operation to the black region. It will, however, be appreciated that the operation flow of the correction process for the case where the degraded image correcting unit 433 applies the dilation or erosion operation to the white region is the same as that for the case where the dilation or erosion operation is applied to the black region, except that the region to be dilated or eroded is the white region.

First, the degraded image correcting unit 433 checks the sign of the degree of degradation, Dg (step S101). If the degree of degradation, Dg, is 0, the degraded image correcting unit 433 terminates the process.

If it is determined in step S101 that the degree of degradation, Dg, is positive, the degraded image correcting unit 433 applies the erosion operation to the encrypted region. For that purpose, the degraded image correcting unit 433 sets the number N of repetitions of the erosion operation to 1 (step S102). Next, the degraded image correcting unit 433 determines whether or not the value (|Dg|−2N) obtained by subtracting 2N from the absolute value of the degree of degradation, Dg, is larger than or equal to 0 (step S103). If (|Dg|−2N) is larger than or equal to 0 (Yes in step S103), the degraded image correcting unit 433 applies the erosion operation to all the black regions contained in the encrypted region (step S104). As a result, the width and height of each black region are each reduced by two pixels. Then, the degraded image correcting unit 433 increments the number N of repetitions by 1 (step S105), after which control is passed back to step S103.

On the other hand, if it is determined in step S103 that (|Dg|−2N) is smaller than 0 (No in step S103), the degraded image correcting unit 433 then determines whether (|Dg|−2N) is equal to −1 or not (step S106). If (|Dg|−2N) is equal to −1 (Yes in step S106), the degraded image correcting unit 433 applies the half-erosion operation to all the black regions contained in the encrypted region (step S107). As a result, the width and height of each black region are each reduced by one pixel. After step S107, or if it is determined in step S106 that (|Dg|−2N) is not equal to −1 (No in step S106), the degraded image correcting unit 433 terminates the process.

On the other hand, if it is determined in step S101 that the degree of degradation, Dg, is negative, the degraded image correcting unit 433 applies the dilation operation to the encrypted region. For that purpose, the degraded image correcting unit 433 sets the number N of repetitions of the dilation operation to 1 (step S108). Next, the degraded image correcting unit 433 determines whether or not the value (|Dg|−2N) obtained by subtracting 2N from the absolute value of the degree of degradation, Dg, is larger than or equal to 0 (step S109). If (|Dg|−2N) is larger than or equal to 0 (Yes in step S109), the degraded image correcting unit 433 applies the dilation operation to all the black regions contained in the encrypted region (step S110). As a result, the width and height of each black region are each expanded by two pixels. Then, the degraded image correcting unit 433 increments the number N of repetitions by 1 (step S111), after which control is passed back to step S109.

On the other hand, if it is determined in step S109 that (|Dg|−2N) is smaller than 0 (No in step S109), the degraded image correcting unit 433 then determines whether (|Dg|−2N) is equal to −1 or not (step S112). If (|Dg|−2N) is equal to −1 (Yes in step S112), the degraded image correcting unit 433 applies the half-dilation operation to all the black regions contained in the encrypted region (step S113). As a result, the width and height of each black region are each expanded by one pixel. After step S113, or if it is determined in step S112 that (|Dg|−2N) is not equal to −1 (No in step S112), the degraded image correcting unit 433 terminates the process.

The degraded image correcting unit 433 that has corrected the encrypted image captured by the image input unit 2 passes the corrected image to the decryption unit 434.

The decryption unit 434 reconstructs the original image by applying decryption to the corrected image supplied from the degraded image correcting unit 433.

First, the decryption unit 434 corrects any local expansion, contraction, or distortion that has been caused within the encrypted region in such cases as when the encrypted image was captured by the image input unit 2. For example, the decryption unit 434 detects the position of each inversion marker within the encrypted region. Then, by detecting the displacement between the detected position and the position that would be located if there were no expansion, contraction, or distortion in the encrypted region, the decryption unit 434 can detect the amount of distortion, expansion, or contraction occurring locally within the encrypted region.

Then, the decryption unit 434 applies filtering to the encrypted image to extract the inversion markers. The inversion markers are made up of pixels whose pixel values are inverted with respect to the surrounding pixels. The decryption unit 434 then smoothes the image by applying median filtering to each inversion marker as well as to the pixels surrounding the inversion marker and contained in the same block as the inversion marker. Then, by taking the absolute differences between the pixels in the smoothed image and the corresponding pixels in the encrypted image, the decryption unit 434 can create a marker extraction image in which only the pixels corresponding to the inversion markers have large pixel values.

Next, by considering the fact that the inversion markers are arranged at periodically spaced intervals in the horizontal and vertical directions, the decryption unit 434 obtains the periodicities in the horizontal and vertical directions on the marker extraction image in which the inversion markers are extracted. For this purpose, the decryption unit 434 creates a signal profile for the horizontal direction by calculating the sum of pixel values for each column in the marker extraction image. The decryption unit 434 likewise creates a signal profile for the vertical direction by calculating the sum of pixel values for each row in the marker extraction image. For any row or column along which many inversion markers are arranged, the sum of the pixel values becomes relatively large, while on the other hand, for any row or column along which no inversion markers are arranged, the sum of the pixel values becomes relatively small. Further, the columns and rows where the sum of the pixel values is large appear periodically at intervals approximately equal to the horizontal length and the vertical length, respectively, of the unit block based on which the scrambling is performed. In view of this, the decryption unit 434 performs pattern matching by comparing each of the signal profiles, created for the horizontal and vertical directions, respectively, with a one-dimensional template that has a large value for any column along which the inversion markers are arranged and a small value for any other column if the encrypted region is free from expansion, contraction, or distortion. It is preferable to perform the pattern matching using dynamic programming, because the processing can then be performed efficiently. As a result of the pattern matching, the decryption unit 434 can determine that the position corresponding to the one where the signal value of the template is large is the position of the column or row along which the inversion markers are arranged. Then, the decryption unit 434 obtains the amount of displacement between the position of the column or row along which the inversion markers are arranged and the position of the column or row along which the inversion markers are arranged in the encrypted region free from expansion, contraction, or distortion. The decryption unit 434 locally expands or contracts the encrypted region so as to eliminate the amount of displacement so that the columns and rows along which the inversion markers are arranged appear periodically at intervals corresponding to the horizontal length and the vertical length, respectively, of the unit block.

Next, the decryption unit 434 reinverts the pixel values of all the pixels contained in each inversion marker. More specifically, as earlier described in connection with the decryption process, the decryption unit 434 obtains the average value $P_{av}$ of the pixels surrounding the inversion marker and contained in the same block as the inversion marker, and selects one or the other of the earlier given equations (2) and (3) in accordance with the average value $P_{av}$. Then, using the selected equation, the decryption unit 434 reinverts the pixel values of the pixels contained in the inversion marker.

Finally, the decryption unit 434 reconstructs the original image by applying descrambling to the image in which the pixel values have been reinverted. Using the block position conversion equation (1) and the encryption key used to scramble the image, the decryption unit 434 can determine the original position x, within the encrypted image, of each block whose position after scrambling is denoted by y. The decryption unit 434 can reconstruct the original image by moving each block in the encrypted image to the thus determined original block position.

The processing unit 43 transmits the reconstructed original image to the output unit 3 via the communication unit 41. The processing unit 43 may also store the reconstructed original image in the storage unit 42.

FIG. 10 is an operation flowchart illustrating the decryption process which includes the image correction process and which is performed under the control of the computer program executed on the processing unit 43 in the image decryption device 4.

As illustrated in FIG. 10, when the decrypted image printed on the medium is captured by the image input unit 2 and presented in the form of electronic data to the image decryption device 4, the processing unit 43 initiates the decryption process. The pattern detection unit 431 in the processing unit 43 detects from the encrypted image the specific pattern of known size and shape that serves as a reference based on which the amount of correction is determined (step S201). In the present embodiment, the specific pattern is the check pattern attached to each of the four corners of the encrypted region contained in the encrypted image. The pattern detection unit 431 passes the position information indicating the position of the detected specific pattern on to the degree-of-degradation measuring unit 432 in the processing unit 43.

The degree-of-degradation measuring unit 432 obtains the amount of displacement by measuring the amount by which the length of the specific pattern detected from the encrypted image is displaced from the length of the degradation-free ideal specific pattern, and determines the amount of displacement as the degree of degradation (step S202). For example, the degree-of-degradation measuring unit 432 calculates the differences between the horizontal and vertical lengths of each black region contained in the check pattern detected from the encrypted image and the horizontal and vertical lengths of the corresponding black region contained in the degradation-free ideal check pattern. Then, the degree-of-degradation measuring unit 432 determines the degree of degradation, Dg, by taking the average value of the differences. The degree-of-degradation measuring unit 432 passes the thus determined degree of degradation, Dg, to the degraded image correcting unit 433 in the processing unit 43.

The degraded image correcting unit 433 corrects the encrypted image by applying processing to the encrypted region in the encrypted image to dilate or erode the black or white region according to the degree of degradation, Dg (step S203). The degraded image correcting unit 433 carries out the processing in step S203 in accordance with the flowchart of FIG. 9. The degraded image correcting unit 433 passes the corrected image to the decryption unit 434 in the processing unit 43.

The decryption unit 434 reconstructs the original image by applying decryption to the corrected image (step S204). More specifically, as earlier described, the decryption unit 434 corrects any local expansion, contraction, or distortion within the encrypted region in the corrected image so that the inversion markers are arranged periodically at intervals corresponding to the horizontal length and the vertical length, respectively, of the unit block. Next, the decryption unit 434 reinverts the pixel values of the pixels contained in each inversion marker in the encrypted region. Then, the decryption unit 434 can reconstruct the original image by applying descrambling to the encrypted region and thus reordering the pixel positions on a block-by-block basis.

The processing unit 43 transmits the reconstructed original image to the output unit 3 via the communication unit 41 (step S205). After that, the processing unit 43 terminates the decryption process.

As described above, the image processing system according to the one embodiment detects the specific pattern of known shape and size attached to the encrypted image from the electronic data generated by the image input unit reading the medium on which the encrypted image is printed. Then, the image processing system measures the degree of degradation by measuring the amount by which the length of the black or white region contained in the detected specific pattern is displaced from the length thereof in the degradation-free specific pattern. As a result, the image processing system can accurately estimate the degree of degradation of the encrypted image captured from the medium in the form of electronic data. Then, the image processing system corrects the encrypted image so as to reduce the degree of degradation by performing processing to dilate or erode the black or white region contained in the encrypted region in the encrypted image. The image processing system reconstructs the original image by decrypting the thus corrected encrypted image. Accordingly, the image processing system can accurately reconstruct the original image even when the encrypted image captured in the form of electronic data by the image input unit is degraded.

The present invention is not limited to the above specific embodiment. For example, when the encrypted image printed on the medium is captured and converted in advance into electronic data by an apparatus provided separately from the image processing system, and the image decryption device can acquire the electronic data of the encrypted image via its communication unit, the image input unit may be omitted. In such cases, the file format of the electronic data carrying the encrypted image may not necessarily be an image data format such as JPEG (Joint Photographic Experts Group) or tiff (Tagged Image File Format). For example, the file format of the electronic data carrying the encrypted image may be some other format, such as pdf (Portable Document Format) or HTML (HyperText Markup Language), that also contains text. Even when the file format of the electronic data carrying the encrypted image is not an image data format, the processing unit in the image decryption device can apply the above-described image correction and image decryption operations to the encrypted image by extracting information concerning the encrypted image carried in the electronic data.

The pattern detection unit in the processing unit may detect a given one of the inversion markers in the encrypted region as the specific pattern for measuring the degree of degradation. Further, after generating the encrypted image by encrypting the original image, the encryption device that encrypted the original image may attach a pattern of known shape and size to the encrypted region in the encrypted image or around the periphery of the encrypted region. For example, the encryption device may attach a pattern of alternating black and white regions, each of a prescribed width, to the upper left side of the periphery of the encrypted region. In this case, the pattern detection unit may detect as the specific pattern the pattern of known shape and size attached to the encrypted region or around the periphery thereof.

Since the shape and size of such specific patterns are known in advance, the pattern detection unit can detect these specific patterns by performing, for example, template matching between the encrypted image and a template describing the degradation-free ideal specific pattern.

However, the value of the pixels contained in the inversion marker varies depending on the value of the pixels contained in the inversion marker and the value of the pixels surrounding the inversion marker. As a result, there is the possibility that the shape of the inversion marker contained in the encrypted region may match the shape of the degradation-free inversion marker, even when the encrypted image is not degraded. In view of this, when detecting the inversion marker as the specific pattern, the pattern detection unit corrects the position of the inversion marker by applying distortion, expansion, or contraction correcting operations, similar to those described in connection with the decryption unit, to the encrypted image so that the inversion marker can be correctly detected. It is preferable for the pattern detection unit to detect the inversion marker based on the thus corrected position. Then, the pattern detection unit performs template matching between the encrypted image corrected for distortion, expansion, or contraction and a template describing the degradation-free inversion marker, and thereby obtains the degree of matching between the encrypted image and the template. The degree of matching can be obtained by taking, for example, the maximum value among the correlation values calculated by dividing the number of pixels whose values match between the encrypted image and the template by the number of pixels in the template while changing the position of the encrypted image relative to the template. The pattern detection unit detects as the specific pattern only the inversion marker whose degree of matching is not smaller than a predetermined value. The predetermined value here can be set, for example, to 0.7 when the degree of matching ranges from 0 to 1.

In addition, the degree-of-degradation measuring unit in the processing unit can measure the degree of degradation by examining the change in the size of the black or white region contained in the detected specific pattern, in a manner similar to that described earlier in connection with the degree-of-degradation measuring unit. For example, the degree-of-degradation measuring unit calculates the average value of the differences between the width and height of the inversion marker detected as the specific pattern and the width and height of the degradation-free inversion marker, rounds off any fractions of the average value, and determines the thus obtained value as the degree of degradation.

Further, in the image processing apparatus, the image correction process performed by the pattern detection unit, the degree-of-degradation measuring unit, and the degraded image correcting unit may be repeated two or more times. The image correction process refers to the process from step S201 to step S203 in the flowchart of FIG. 10. For example, in the first image correction process, the pattern detection unit detects the check pattern as the specific pattern from the encrypted image. Then, the degree-of-degradation measuring unit measures the degree of degradation, based on the detected check pattern. The degraded image correcting unit corrects the encrypted image, based on the degree of degradation.

Next, in the second image correction process, the pattern detection unit detects a given one of the inversion markers as the specific pattern from the encrypted image corrected in the first image correction process. Then, the degree-of-degradation measuring unit once again measures the degree of degradation, based on the detected check pattern. The degraded image correcting unit once again corrects the once-corrected encrypted image, based on the degree of degradation. Thereafter, the image correction process is repeated until a predetermined number of repetitions is reached or until the absolute value of the degree of degradation measured is reduced to or below a predetermined value. Preferably, the position of the specific pattern to be detected in each image correction process is changed from that in the preceding image correction process so that the entire encrypted image can be corrected in a balanced manner. The decryption unit in the processing unit applies decryption to the corrected image obtained by repeating the image correction process.

By applying decryption to the corrected image obtained by repeating the image correction process a plurality of times, the image processing apparatus can reconstruct the original image more accurately.

The image to be corrected by the image processing apparatus is not limited to an encrypted image. Any image can be corrected by the above image correction process, as long as the image is printed on a medium such as paper and a pattern of known shape and size is contained in the image or attached to the periphery thereof. When the image to be corrected is not an encrypted image, the decryption unit in the processing unit of the image processing apparatus may be omitted.

Further, the computer program for causing a computer to implement the functions of the pattern detection unit, the degree-of-degradation measuring unit, the degraded image correcting unit, and the decryption unit constituting the processing unit of the image processing apparatus may be provided in the form recorded on a medium readable by the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. An image processing system comprising:
   an image input unit for reading an image printed on a medium and generating electronic data representing said image; and
   a processing unit for correcting said image represented by said electronic data, wherein said processing unit implements the functions of:
   detecting, from said image represented by said electronic data, a first pattern having a first size and shape that is attached to said image;
   measuring a degree of degradation by measuring an amount of displacement of the size of said detected first pattern from said first size; and
   correcting said image represented by said electronic data to reduce said degree of degradation.

2. The image processing system according to claim 1, wherein said first size represents a length of a region contained in said first pattern and having a pixel value not larger than a predetermined value, and said degree-of-degradation measuring function measures said degree of degradation by calculating a difference by subtracting said first size from the length of said region contained in said detected first pattern and having a pixel value not larger than said predetermined value, and wherein said correcting function performs processing so that when said degree of degradation has a positive value, said region having a pixel value not larger than said predetermined value, said region being contained in said image represented by said electronic data, is eroded so as to reduce the length of said region by an amount equal to the absolute value of said degree of degradation, while when said degree of degradation has a negative value, said region having a pixel value not larger than said predetermined value, said region being contained in said image represented by said electronic data, is dilated so as to increase the length of said region by an amount equal to the absolute value of said degree of degradation.

3. The image processing system according to claim 1, wherein said processing unit causes said pattern detecting function to a second pattern having a second size and shape from said image corrected by said correcting function, causes said degree-of-degradation measuring function to measure a second degree of degradation by measuring an amount of displacement of the size of said detected second pattern from said second size, and causes said image correcting function to further correct said corrected image to reduce said second degree of degradation.

4. The image processing system according to claim 3, wherein said image represented by said electronic data is an encrypted image in which at least a selected region in said image is encrypted, and wherein said pattern detecting function detects as said second pattern a pattern that indicates a prescribed position within said encrypted region.

5. The image processing system according to claim 4, wherein said processing unit further implements the function of reconstructing an original image by decrypting the encrypted image corrected by said correcting function.

6. The image processing system according to claim 1, wherein said image represented by said electronic data is an encrypted image in which at least a selected region in said image is encrypted, and wherein said pattern detecting function detects as said first pattern a pattern that indicates a boundary of said encrypted region.

7. The image processing system according to claim 6, wherein said processing unit further implements the function of reconstructing an original image by decrypting the encrypted image corrected by said correcting function.

8. An image processing method comprising:

reading an image printed on a medium and generating electronic data representing said image;

detecting, from said image represented by said electronic data, a pattern having a designated size and shape that is attached to said image by a processor;

measuring a degree of degradation by measuring an amount of displacement of the size of said detected pattern from said designated size by the processor; and correcting said image represented by said electronic data to reduce said degree of degradation by the processor.

9. A computer readable medium encoded with computer to executable instructions performing a method comprising:

detecting, from an image represented by electronic data acquired by reading said image printed on a medium, a pattern having a designated size and shape that is attached to said image;

measuring a degree of degradation by measuring an amount of displacement of the size of said detected pattern from said designated size; and correcting said image represented by said electronic data to reduce said degree of degradation.

* * * * *

UNITED STATES PATENT AND TRADEMARK OFFICE
CERTIFICATE OF CORRECTION

PATENT NO. : 8,339,677 B2
APPLICATION NO. : 13/164851
DATED : December 25, 2012
INVENTOR(S) : Shohei Nakagata et al.

It is certified that error appears in the above-identified patent and that said Letters Patent is hereby corrected as shown below:

Column 22, Line 27, In Claim 9, delete "computer to" and insert -- computer --, therefor.

Signed and Sealed this
Twenty-sixth Day of March, 2013

Teresa Stanek Rea
*Acting Director of the United States Patent and Trademark Office*